US006617368B2

United States Patent
Steppan et al.

(10) Patent No.: US 6,617,368 B2
(45) Date of Patent: Sep. 9, 2003

(54) ISOTROPIC RIGID FOAMS

(75) Inventors: David D. Steppan, Gibsonia, PA (US); Alan D. Bushmire, McDonald, PA (US); Edward E. Ball, Weirton, WV (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 10/008,551

(22) Filed: Nov. 13, 2001

(65) Prior Publication Data

US 2003/0134923 A1 Jul. 17, 2003

(51) Int. Cl.$^7$ .............................................. C08G 18/48
(52) U.S. Cl. ...................... 521/159; 521/137; 521/174; 521/176
(58) Field of Search ............................. 521/137, 159, 521/174, 176

(56) References Cited

U.S. PATENT DOCUMENTS

| | | | |
|---|---|---|---|
| 4,795,763 A | 1/1989 | Gluck et al. | 521/99 |
| 4,972,002 A | 11/1990 | Volkert | 521/120 |
| 4,981,879 A | 1/1991 | Snider | 521/131 |
| 5,034,424 A | 7/1991 | Wenning et al. | 521/109.1 |
| 5,149,722 A | 9/1992 | Soukup | 521/99 |
| 5,192,607 A | 3/1993 | Soukup | 428/314.4 |
| 5,254,601 A | 10/1993 | Doerge | 521/131 |
| 5,276,067 A | 1/1994 | Doerge | 521/131 |
| 5,318,996 A | 6/1994 | Yu-Hallada et al. | 521/131 |
| 5,391,317 A | 2/1995 | Smits | 252/182.24 |
| 5,547,998 A | 8/1996 | White, III et al. | 521/131 |
| 5,698,608 A * | 12/1997 | Nagashima | 521/159 |
| 5,840,212 A | 11/1998 | Doerge | 252/350 |
| 5,840,781 A | 11/1998 | Dietrich et al. | 521/167 |
| 5,962,541 A * | 10/1999 | Peterson et al. | 521/131 |
| 6,245,826 B1 | 6/2001 | Wilson et al. | 521/174 |
| 6,395,798 B1 * | 5/2002 | Younes | 521/159 |

FOREIGN PATENT DOCUMENTS

| | | |
|---|---|---|
| EP | 508649 | 10/1992 |
| JP | 57-147510 | 9/1982 |
| JP | 3-137137 | 6/1991 |
| JP | 3-137138 | 6/1991 |

* cited by examiner

*Primary Examiner*—John M. Cooney, Jr.
(74) *Attorney, Agent, or Firm*—Joseph C. Gill; N. Denise Brown

(57) ABSTRACT

This invention relates to a process for the preparation of an isotropic rigid foam comprising the step of reacting: (A) an organic polyisocyanate component selected from the group consisting of: (1) a polymethylene poly(phenylisocyanate) and (2) an NCO-terminated prepolymer, and comprising the reaction product of: (a) a polyester comprising the reaction product of (i) pure ortho-phthalic acid or phthalic anhydride and (ii) a glycol and (b) a polymethylene poly (phenylisocyanate); with (B) an isocyanate-reactive component comprising: (1) a liquid OH-terminated prepolymer having a viscosity of more than about 100,000 mPa·s at 25° C., and which comprises the reaction product of: (a) an organic aromatic polyisocyanate component; and (b) an amine initiated polyether polyol component; (2) at least one polyether polyol and optionally (3) at least one aromatic polyester polyol; in the presence of: (C) at least one catalyst; and (D) at least one blowing agent; wherein the relative amounts of components present is such that the Isocyanate Index is from 90 to 170. This invention also relates to the isotropic rigid foams prepared thereby.

34 Claims, No Drawings

ISOTROPIC RIGID FOAMS

FIELD OF THE INVENTION

This invention relates to a process for the preparation of an isotropic rigid foam comprising the step of reacting: (A) an organic polyisocyanate component selected from the group consisting of: (1) a polymethylene poly (phenylisocyanate) and (2) an NCO-terminated prepolymer, and comprising the reaction product of: (a) a polyester comprising the reaction product of (i) pure ortho-phthalic acid or phthalic anhydride and (ii) a glycol and (b) a polymethylene poly(phenylisocyanate); with (B) an isocyanate-reactive component comprising: (1) a liquid OH-terminated prepolymer having a viscosity of at least about 100,000 mPa·s at 25° C., and which comprises the reaction product of: (a) an organic aromatic polyisocyanate component; and (b) an amine initiated polyether polyol component; (2) at least one polyether polyol and optionally (3) at least one aromatic polyester polyol; in the presence of: (C) at least one catalyst; and (D) at least one blowing agent; wherein the relative amounts of components present is such that the Isocyanate Index is from 90 to 170. This invention also relates to the isotropic rigid foams prepared thereby.

BACKGROUND OF THE INVENTION

The present invention relates to a process for producing rigid foams with desirable insulation characteristics (as measured by k-factor) and with isotropic closed cells (as measured by the aspect ratio), and to the foams produced thereby. Closed celled rigid polyisocyanate foams are in general prepared by reacting the appropriate polyisocyanate and polyol in the presence of a blowing agent. One use of such foams is as a thermal insulation medium as for example in the construction of refrigerated storage devices. The thermal insulating properties of closed celled rigid foams are dependent upon a number of factors including the cell size and the thermal conductivity of the contents of the cells.

Rigid foams of commercial densities of about 2 lb/ft$^3$ typically suffer from a cell elongation in the flow direction. The cell elongation causes the foam to have very different properties in the different dimensions. As is well known, the thermal conductivity of a foam generally increases with a poor cell structure. The object of the present invention is to eliminate anisotropy in foam physical properties due to flow direction. By making the cell rounder, or more isotropic, a uniform and high quality foam results. As the cell becomes more isotropic, the aspect ratio of the properties in the parallel (flow direction) to the perpendicular (flow direction) becomes closer to unity.

In order to improve the thermal insulation of closed celled rigid polyurethane and polyisocyanate foams blown with blowing agents a variety of techniques have been proposed, most of them concentrated on decreasing the thermal radiation component of the thermal conductivity of the rigid foam. One of these techniques consists of adding carbon black to the foam formulation. The use of carbon black to improve the thermal insulation of closed celled rigid polyurethane foam is described in U.S. Pat. Nos. 4,795,763, 5,149,722 and 5,192,607 and Japanese patent publication Kokai No. 57/147510.

Another way of decreasing the thermal radiation component consists of decreasing the foam cell sizes. Thus European patent publication No. 0 508 649, and U.S. Pat. Nos. 4,981,879, 5,034,424 and 4,972,002 describe the use of a substantially fluorinated or perfluorinated hydrocarbon additive as (co)-blowing agent or nucleating agent in closed celled rigid polyurethane foam in order to reduce the foam cell size.

Chlorofluorocarbons were the blowing agents most commonly used until recently. However, when it became known that these chlorofluorocarbons posed environmental problems, the search for alternative blowing agents began. Among the blowing agents considered to be promising alternatives to the chlorofluorocarbons (CFCs) are hydrocarbons such as hydrogen-containing chlorofluorocarbons (HCFCs), highly fluorinated compounds (HFCs) and mixtures of HCFCs and HFCs. HCFC-141b is one of the more promising alternative blowing agents and has been the subject of a number of publications. U.S. Pat. No. 5,397,808, for example, discloses low thermal conductivity foams made with a combination of HCFC-141b, perfluorinated compounds and carbon black.

U.S. Pat. No. 6,245,826 discloses an isocyanate-based rigid foam comprising the reaction product of an organic polyisocyanate, a resin blend and, optionally, a relatively low molecular weight chain extender or crosslinker in the presence of a catalyst, and, optionally, further auxiliaries and/or additives. The resin blend comprises a phthalic anhydride-initiated polyester polyol, a blowing agent comprising a $C_4$–$C_6$ hydrocarbon, and a fatty acid or fatty alcohol ethoxylate compatibilizing agent. An OH-terminated prepolymer is not disclosed as a component on the isocyanate-reactive side of the reaction.

U.S. Pat. No. 5,840,781 discloses a polyether polyol made by reacting propylene oxide with o-toluene diamine. The polyether polyol is reacted with organic polyisocyanates, optionally further compounds with at least 2 hydrogen atoms reactive to isocyanates, in the presence of traditional blowing agents to form a rigid foam. An OH-terminated prepolymer is not disclosed as a component on the isocyanate-reactive side of the reaction.

U.S. Pat. No. 5,840,212 discloses rigid foams having improved insulation properties made by reacting a polyisocyanate with an isocyanate-reactive material in the presence of a blowing agent mixture composed of from a $C_2$–$C_5$ polyfluoroalkane and an HCFC. An OH-terminated prepolymer is not disclosed as a component on the isocyanate-reactive side of the reaction.

U.S. Pat. No. 5,318,996 discloses rigid insulating polyurethane oams prepared from ternary blowing agent mixtures which blowing agent ixtures were composed of water, HCFC-22 or HCFC-141b and a perfluorinated hydrocarbon having from 3 to 8 carbon atoms. An OH-terminated prepolymer is not disclosed as a component on the isocyanate-reactive side of the reaction U.S. Pat. No. 5,276,067 discloses rigid polyurethane foams having low thermal conductivities made by reacting an organic polyisocyanate with an organic material having at least 2 isocyanate reactive hydrogen atoms in the presence of a blowing agent. The blowing agent is an HCFC and water. An OH-terminated prepolymer is not disclosed as a component on the isocyanate-reactive side of the reaction.

U.S. Pat. No. 5,391,317 sought to manufacture a foam having both good dimensional stability and thermal insulation using hydrocarbons as blowing agents. This reference taught the use of a particular mixture of $C_5$–$C_6$ alicyclic alkanes, isopentane and n-pentane blowing agents in particular molar percents, in combination with a polyol mixture made up of an aromatic initiated polyether polyol, an aromatic polyester polyol, and a different amine initiated polyether polyol. An OH-terminated prepolymer is not disclosed as a component on the isocyanate-reactive side of the reaction.

Others have also tried to modify the polyol components in a polyol composition in an attempt to solubilize a hydrocarbon blowing agent in the polyol composition. In U.S. Pat. No. 5,547,998, the level of aliphatic amine initiated polyether polyols in a polyol composition is limited to solubilize cyclopentane in the polyol composition. When reacted with an organic isocyanate, the polyol composition, comprising an aromatic amine initiated polyoxyalkylene polyether polyol and an aliphatic amine initiated polyoxyalkylene polyether polyol in an amount of 10 weight percent or less by weight of the polyol composition produces a dimensionally stable rigid closed cell polyurethane foam having good thermal insulation properties.

The problem of obtaining a closed cell rigid polyurethane foam having both good dimensional stability and thermal insulation at low densities was also discussed in "An Insight Into The Characteristics of a Nucleation Catalyst in HCFC-Free Rigid Foam System" by Yoshimura et al. This publication reported the results of evaluations on a host of catalysts used in a standard polyurethane formulation to test the effects of each catalyst on the thermal insulation and dimensional stability of the foam.

By the process of the present invention fine, closed celled, preferably isotropic rigid polyurethane polyisocyanate foams are obtained having desirable thermal insulation properties that exhibit reduced cell elongation in the flow direction.

SUMMARY OF THE INVENTION

This invention relates to a process for the preparation of a rigid foam, which is preferably isotropic, comprising the step of reacting: (A) an organic polyisocyanate component selected from the group consisting of: (1) a polymethylene poly(phenylisocyanate) and (2) an NCO-terminated prepolymer, and comprising the reaction product of: (a) a polyester comprising the reaction product of (i) pure ortho-phthalic acid or phthalic anhydride and (ii) a glycol and (b) a polymethylene poly(phenyl-isocyanate); with (B) an isocyanate-reactive component comprising: (1) a liquid OH-terminated prepolymer having a viscosity of at least about 100,000 mPa·s at 25° C., and which comprises the reaction product of: (a) an organic aromatic polyisocyanate component; and (b) an amine initiated polyether polyol component; (2) at least one polyether polyol and optionally (3) at least one aromatic polyester polyol; in the presence of: (C) at least one catalyst; and (D) at least one blowing agent; wherein the relative amounts of components present is such that the Isocyanate Index is from 90 to 170. This invention also relates to the rigid foams, which are preferably isotropic, prepared by this process.

DETAILED DESCRIPTION OF THE INVENTION

Suitable polymethylene poly(phenyl isocyanates) for component (A)(1) of the organic polyisocyanate component (A) of the present invention include those having an NCO group content of from about 30.5% to about 33.0%, preferably about 31.5%, and a monomer content of from about 42% to about 48% by weight, wherein (i) less than about 0.5% by weight is the 2,2'-isomer of MDI, (ii) from about 2 to 4% by weight is the 2,4'-isomer of MDI, (iii) from about 40 to about 46% by weight is the 4,4'-isomer of MDI, and (iv) from about 52 to 58% by weight is higher ring homologues of the diphenylmethane diisocyanate series, with the %'s by weight of (i), (ii), (iii) and (iv) totaling 100% by weight of (A)(1).

Component (A) an organic polyisocyanate component can also be (A)(2) an NCO-terminated prepolymer. Suitable prepolymers to be used as component (A)(2) in the polyisocyanate component (A) of the present invention are characterized by an NCO group content of from about 26.0 to about 30.0%, and preferably about 29%. This component should be liquid and pourable at 50–60° C. or below. These prepolymers comprise the reaction product of:
  (a) a polyester comprising the reaction product of:
    (i) pure ortho-phthalic acid or phthalic anhydride; and
    (ii) a glycol; and
  (b) a polymethylene poly(phenylisocyanate) having an NCO group content of about 30.5 to 33.0%, preferably 31.5%, and a monomer content of about 42 to 48%, wherein the polyisocyanate comprises:
    (i) less than about 0.5% by weight of 2,2'-diphenylmethane-diisocyanate,
    (ii) from about 2 to about 4% by weight of 2,4'-diphenylmethane diisocyanate,
    (iii) from about 40% to about 46% by weight of 4,4'-diphenylmethane diisocyanate, and
    (iv) from about 52 to about 58% by weight of higher ring homologues of the diphenylmethane diisocyanates series, with the %'s by weight of (i), (ii), (iii) and (iv) totaling 100% by weight of component (A)(2)(b).

It is preferred that component (A)(2)(a)(i) is pure ortho-phthalic acid.

Suitable glycols that can be employed as component (A)(2)(a)(ii) include ethylene glycol, propylene glycol, diethylene glycol, dipropylene glycol, neopentyl glycol, triethylene glycol, tetraethylene glycol, tripropylene glycol, as well as mixtures thereof. It is preferred that component (A)(2)(a)(ii) is diethylene glycol.

Component (B)(1) a liquid OH-terminated prepolymer has a viscosity of at least about 100,000 mPa·s at 25° C., and which comprises the reaction product of (B)(1)(a) and (B)(1)(b). Component (B)(1) is present in an amount of from about 2 to about 20%, 5 to 15% preferably, based on 100% by weight of (B). Preferably, component (B)(1) a liquid OH-terminated prepolymer has a viscosity of about 200,000 to about 500,000 mPa·s at 25° C. Preferably component (B)(1) comprises the reaction product of (a) an aromatic polyisocyanate component comprising toluene diisocyanate and (b) a polyether polyol initiated from ortho-toluenediamine, having a molecular weight of about 340, a functionality of about 4 and an OH number of about 665. More preferably, (B)(1)(a) is an aromatic polyisocyanate component comprising about 80% by weight of the 2,4'-isomer and about 20% by weight of the 2,6'-isomer.

The term "liquid" as used herein to describe component (B)(1) the liquid OH-terminated prepolymer, refers to these liquid OH-terminated prepolymers having a viscosity of more than about 100,000 mPa·s at 25° C., and preferably of less than 500,000 mPa·s at 25° C.

Component (B)(1)(a) is reacted with component (B)(1)(b) an amine initiated polyether polyol in order to form the liquid OH-terminated prepolymer (B)(1). The isocyanate prepolymers of the present invention, (B)(1) a liquid OH-terminated prepolymer, can be prepared, for example, by blending the polyol (B)(1)(b) and isocyanate (B)(1)(a) under a nitrogen blanket or sparge, optionally, in the presence of a catalyst, for example, 0.02% of T-9, stannous octoate, and heating to about 105oC for between 4 and 12 hours. The reaction is monitored by %NCO titration. Other suitable processes for the preparation of prepolymers which are known can also be used.

Component (B)(1)(a) an organic aromatic polyisocyanate component can be selected from the group consisting of: m- or p-phenylene diisocyanate, toluene-2,4-diisocyanate, toluene-2,6-diisocyanate, hexahydrotoluene diisocyanate (and isomers), 1-methylphenyl-2,4-phenyl diisocyanate, diphenyl-methane-4,4'-diisocyanate, diphenylmethane-2,4'-diisocyanate, 4,4'-biphenylene diisocyanate, 3,3'-methoxy-4,4'-biphenylene diisocyanate, 3,3'-dimethyldiphenylpropane-4,4'-diisocyanate, toluene-2,4,6-triisocyanate, 4,4'-dimethyldiphenyl-methane-2,2',5,5'-tetraisocyanate and the diverse polymethylene polyphenyl polyisocyanates.

Component (B)(1)(b) an amine initiated polyether polyol component is based on di- or tri-functional starters such as, for example, ethylene diamine, toluene diamine, diethylene triamine, triethanolamine, and diethylene tetramine. Preferably component (B)(1)(b) an amine initiated polyether polyol has a molecular weight of from about 190 to 5000, a functionality of from about 1.5 to about 6 and an OH number of from about 20 to about 700.

Suitable polyether polyols to be used as component (B)(2) of the invention, include hydroxyl terminated polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably, ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine, ethylene diamine, sorbitol and mixtures thereof.

The polyether polyol component (B)(2) is present in an amount of from about 50 to about 98% of component (B), based on 100% by weight of component (B) and has a molecular weight of from about 280 to about 1120, a functionality of from about 2 to about 6, and an OH number of from 300 to 800. It is preferred that the polyether polyol component (B)(2) comprise about 65 to 85% of component (B), based on 100% by weight of component (B). It is also preferred that the polyether polyol component (B)(2) has a functionality of 4 or greater.

Component (B)(3) at least one aromatic polyester polyol has an OH number of from about 100 to about 400 and a functionality of about 1.8 to about 2.5. Component (B)(3) is present in an amount of from about 0 to about 30%, preferably 10 to 30% by weight, based on 100% by weight of (B). In this description, the term "aromatic polyester polyol" is intended to mean a polyhydroxy organic compound having phenolic hydroxy groups. The polyol is used to make the foam strong, non-friable, and dimensionally stable in high heat. The polyol also promotes flame retardancy in the foam.

The aromatic polyester polyol, component (B)(3), is a reaction product of a polyhydric alcohol, preferably a dihydric alcohol and/or a trihydric alcohol with a polybasic, preferably dibasic polycarboxylic acid having an aromatic ring.

In order to form a polyester polyol, a corresponding polycarboxylic anhydride or a corresponding carboxylate ester of a lower alcohol or a mixture thereof can be used in place of a free polycarboxylic acid. The polycarboxylic acid may be an aromatic polycarboxylic acid and/or a heterocyclic polycarboxylic acid, and it may be a polycarboxylic acid substituted with a halogen atom.

Examples of the polycarboxylic acid include phthalic acid including pure ortho-phthalic acid and phthalic anhydride, isophthalic acid, terephthalic acid, trimellitic acid, pyromellitic acid, anhydrous phthalic acid and derivatives thereof. The polyhydric alcohol is preferably an alcohol having 3 to 9 carbon atoms, and may be anyone of a straight-chain, branched or cyclic alcohol. The polyhydric alcohol is preferably a dihydric alcohol and/or a trihydric alcohol. Examples of the dihydric alcohol include ethylene glycol, diethylene glycol, propylene glycol, butanediol, pentanediol, hexanediol, cyclohexanediol and the like. Examples of the trihydric alcohol include glycerine, trimethylolpropane and the like. Those prepared by decomposing polyethylene terephthalate with various glycols may also be used.

Components (A) and (B) are reacted in the presence of (C) at least one catalyst in the process of the present invention. Catalysts suitable to be used in accordance with the present invention include, for example, various organic metal compounds, including, for example, tin(ll) salts of carboxylic acids, dialkyl tin salts of carboxylic acids, dialkyl tin mercaptides, dialkyl tin dithioesters and amines, such as, for example, dimethylcyclohexylamine (i.e., Polycat® 8), pentamethyldiethylenetriamine (i.e., Polycat® 5), bis[2-dimethylamino-ethyl]ether (Niax A®-1), dimethylethanolamine (DMEA), Dabco® WT, triethylene diamine (Dabco® 33LV), pentamethyldipropylene triamine (Polycat® 77), dimethylaminopropylamine (DMAPA), bis(dimethylaminopropylamine) (Polycat® 15), etc. Of course, it is also possible to use any of the catalysts which are well known to those skilled in the art of polyurethane chemistry. It is preferred to use amines as the catalysts in the present invention.

Component (D) in accordance with the present invention comprises at least one blowing agent. At least one blowing agent (D) is present in the reaction in amounts from about 5% to about 40% by weight, based on the total weight of component (B). Suitable blowing agents of the present process may comprise water. If the blowing agent comprises water, the total amount of water used as a blowing agent is from about 0.5% to about 6.0% by weight, preferably about 1% to about 3%, based on the total weight of component (B).

In addition to water, examples of other suitable blowing agents include hydrocarbons, low boiling solvents such as, for example, pentane, cyclopentane, hexane and other known blowing agents. Preferred blowing agents include polyfluoroalkanes including 1,1-dichloro-1-fluoroethane (HCFC-141b) and 1,1,1,3,3-pentafluropropane (HFC-245fa).

It is also possible that various additives and/or auxiliary agents may be included in the reaction. Examples of such additives and/or auxiliary agents include surface-active additives such as, for example, emulsifiers and foam stabilizers, internal mold release agents, pigments, cell regulators, flame retarding agents, plasticizers, dyes, fillers and reinforcing agents such as glass in the form of fibers or flakes or carbon fibers.

Some examples of suitable additives include surface-active additives such as emulsifiers and foam stabilizers. Examples of these include N-stearyl-N',N'-bis-hydroxyethyl urea, oleyl polyoxyethylene amide, stearyl diethanol amide, isostearyl diethanol amide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may be used as surface-active additives.

Suitable foam stabilizers include polyether siloxanes. The structure of these compounds is generally such that a copolymer of ethylene oxide and propylene oxide is attached to a polydimethyl siloxane radical. Such foam stabilizers are described in U.S. Pat. No. 2,764,565. It is preferred to use weak surfactants in the present invention, in amounts of from about 0.3 to about 3% by weight, more preferably in amounts of from about 0.5 to about 2% by weight (based on the weight of the high molecular weight polyether polyol component). Preferred commercially available surfactants include the silicone surfactants B-4690 and B-4113, which are available from Goldschmidt; DC5357, available from Air Products and L620, available from OSI Specialties of Crompton Corporation.

The compositions according to the present invention may be molded using conventional processing techniques at isocyanate indexes ranging from about 90 to 170, preferably from 110 to 145. By the term "Isocyanate Index" (also commonly referred to as "NCO index"), is defined herein as the equivalents of isocyanate, divided by the total equivalents of isocyanate-reactive hydrogen containing materials, multiplied by 100. When water is present as some or all of the blowing agent, the quantity of water present is considered in calculating the isocyanate index.

According to the invention, the components may be reacted together by known processes often using mechanical devices such as those described in U.S. Pat. No. 2,764,565, the disclosure of which is herein incorporated by reference. Details concerning processing apparatus which may be used according to the invention may be found in Kunststoff-Handbuch, Volume VII, published by Vieweg and Hochtlen, Carl-Hanser-Verlag, Munich, 1966, pp.121 and 205.

In accordance with the present invention, the foaming reaction for producing foam products is often carried out inside molds. In the process, the foamable reaction mixture is introduced into a mold, which may be made of a metal such as aluminum or a plastics material such as an epoxide resin. The reaction mixture foams up inside the mold to produce the shaped product. The process of foaming in molds is carried out to produce a product having a cellular structure on its surface. According to the invention, the desired result can be obtained by introducing at least a sufficient foamable reaction mixture to fill the mold with foam after the reaction is completed.

External mold release agents known in the art, such as silicone waxes and oils, are frequently used when foaming is carried out inside the molds. The process may also be carried out with the aid of so-called internal mold release agents, if desired, in combination with external mold release agents, e.g., described in German Offenlegungsschriften Nos. 2,121,670 and 2,307,589.

Cold setting foams may also be produced, as described in British Patent No. 1,162,517 and German Offenlegungsschriften No. 2,153,086.

By isotropic rigid polyurethane polyisocyanate foam as used herein is meant closed celled rigid polyurethane polyisocyanate foam having cells of average diameter less than 200 micron, preferably less than 150 micron. The cell size as used herein represents the isotropic diameter of the cell obtainable according to the method described by A. Cunningham in "Proceedings of Conference on Heat in Mass Transfer in Cryoengineering and Refrigeration", September 1986, page 32–49.

The aspect ratio is the ratio of the length of the cell to the width of the cell with the length dimension being parallel to the flow direction for the foam. It is desirable to obtain rigid foams with aspect ratios at or near 1 in order for physical properties to be consistent in both dimensions. Therefore, the presently claimed foams contain symmetric cell size.

The present invention also relates to the (preferably isotropic) rigid foams produced from the above described process. The (preferably isotropic) rigid foams of the present invention exhibit uniform properties in both dimensions (parallel and perpendicular to the flow direction). The isotropic rigid foams are also good insulators exhibiting a low k-Factor. The k-Factor represents thermal conductivity. The lower the value of k, the more desirable the foam is for insulation purposes.

The rigid foams, preferably isotropic rigid foams, prepared according to the invention can be used, for example, in the automobile industry, aircraft industry, shipbuilding industry, furniture and athletic equipment industry and upholstery materials, housing parts, ski shoes, and ski cores. They are especially suitable as insulation materials in the construction and refrigeration industry.

Rigid polyurethane can be used for insulation. Foam laminates of rigid polyurethane foam are useful for residential sheathing (with aluminum skins) and roofing board (with roofing-paper skins). Metal doors and appliance insulation can be insulated by a foam-in-place process. For example, in refrigeration, the polyurethane foam of the present invention can replace fiberglass insulation. Rigid polyurethane of this invention also used as insulation for refrigerated truck trailers, bodies, and rail cars. Packaging can also be foamed-in-place to protect equipment such as pumps or motors.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The following components were used in the working examples:

Isocyanate A: a polymeric diphenylmethane diisocyanate having an NCO group content of about 31.5%, a functionality of about 2.8, and a viscosity of about 200 mPa·s at 25° C., and a monomer content of about 42 to about 48% by weight, and is commercially available from Bayer Corporation. The isomer distribution of this polymeric diphenylmethane diisocyanate comprises (i) less than about 0.5% by weight of the 2,2'-isomer of MDI, (ii) from about 2 to about 4% by weight of the 2,4'-isomer of MDI, (iii) from about 40 to about 46% by weight of the 4,4'-isomer of MDI, and (iv) from about 52 to about 58% by weight of higher ring homologues of the diphenylmethane diisocyanate series, wherein the %'s by weight of (i), (ii), (iii) and (iv) totals 100% by weight of the polyisocyanate composition.

Isocyanate B: an isocyanate prepolymer having an NCO group content of about 28.9% and a viscosity of about 650 mPa·s at 25° C. and comprising the reaction product of about 96% by weight of isocyanate A, 4% by weight polyester B.

Isocyanate C: an isocyanate prepolymer having an NCO group content of about 28.9% and a viscosity of about 650 mpa·s at 25° C. and comprising the reaction product of about 95% by weight of isocyanate A, 5% by weight polyester A.

Isocyanate D: a toluylenediisocyanate comprising about 80% by weight of the 2,4'-isomer and about 20% by weight of the 2,6'-isomer.

Polyether Polyol A: a polyether having a molecular weight of 621, an OH number of 470, a functionality of 5.2 and a viscosity of 28,000 mPa·s at 25° C., commercially available from Bayer Corporation.
Polyether Polyol B: a polyether polyol having a molecular weight of 291, an OH number of 770, a functionality of 4 and a viscosity of 36,000 mPa·s at 25° C., commercially available from Bayer Corporation.
Polyether Polyol C: a polyether polyol having a molecular weight of 626, an OH number of 470, a functionality of 5.24 and a viscosity of 33,000 mPa·s at 25° C., commercially available from Bayer Corporation.
Polyether Polyol D: a polyether diol having a molecular weight of 425, an OH number of 264, a functionality of 2 and a viscosity of 95 mPa·s at 25° C., commercially available from Bayer Corporation
Polyether Polyol E: a polyether polyol initiated from ortho-toluene diamine having a molecular weight of about 340, an OH number of about 665 and a functionality of about 4.
Surfactant A: a silicone surfactant commercially available as Dabco DC 5357 from Air Products.
OH Prepolymer: an OH-terminated prepolymer having a viscosity of 241,000 mPa·s at 25° C. and an OH number of 601, prepared by reacting about 4.8% Isocyanate D and 95.2% Polyether Polyol E.
Polyester A: a PEG polyester prepared from pure o-phthalic acid and commercially available from Stepan Chemical Company.
Polyester B: a PEG polyester prepared from a mixture of ortho and meta isomers of phthalic acid and commercially available from KoSa.
Amine A: a tertiary amine of the formula N,N,N',N',N",N"-pentamethyl-diethylenetriamine, commercially available from Rhein Chemie Corporation.
Blowing Agent A: a dichlorofluoroethane having a molecular weight of 117.
Catalyst A: 1,3,5-tris(3-(dimethylamino)propyl)hexahydro-s-triazine, commercially available from Air Products.

The rigid foams of Examples 1–3 in Table 1 were molded vertically in a 14"×14"×2.5" mold at a temperature of 50° C. Component A) and Component (B) were both processed at 20° C. at an isocyanate index of 140. This isocyanate index was also used in Examples 4–9. The throughput was 160 gm/sec, the demold time was 600 seconds and the release agent was wax.

The thermal conductivites, the k-Factor, were determined by a Fox-Heat Flow meter at 35° F. and 75° F. The "=" indicates the dimension parallel to the flow direction while the "+" indicates the dimension perpendicular to the flow direction. The compressive properties (labeled as "Compr Strgth" in Tables 1 and 2) were tested in accordance with ASTM method D1621.

TABLE 1

| Example: | | 1 | 2 | 3 |
|---|---|---|---|---|
| Polyether Polyol A | grams | 41.6 | 41.6 | 41.6 |
| OH Prepolymer | grams | | 5 | 10 |
| Polyester A | grams | 18.8 | 18.8 | 18.8 |
| Polyether Polyol B | grams | 6.7 | 6.7 | 6.7 |
| Surfactant A | grams | 2.3 | 2.3 | 2.3 |
| Water | grams | 1.4 | 1.6 | 1.7 |
| Amine A | grams | 0.9 | 0.9 | 0.9 |
| Catalyst A | grams | 0.4 | 0.4 | 0.4 |
| Isocyanate B | grams | 138.6 | 152.1 | 165.8 |
| Blowing Agent A | grams | 28.8 | 31.3 | 33.8 |
| Cell Size + | μm | 152 | 161 | 155 |
| Cell Size = | μm | 205 | 173 | 156 |
| Aspect Ratio | | 1.35 | 1.07 | 1.01 |
| Closed Cell Content | % | 86 | 82.1 | 84.2 |
| Compr Strgth 10% + | psi | 10.585 | 10.01 | 8.875 |
| Compr Strgth 10% = | psi | 25.96 | 24.085 | 23.425 |
| Compr Strgth 5% + | psi | 9.305 | 8.16 | 7.48 |
| Compr Strgth 5% = | psi | 27.095 | 22.94 | 22.795 |
| Core Density | lb/ft$^3$ | 1.46 | 1.51 | 1.445 |
| k-Factor (35° F.) | BTU in/hr ft$^2$F | 0.114 | 0.118 | 0.119 |
| k-Factor (75° F.) | BTU in/hr ft$^2$F | 0.121 | 0.125 | 0.126 |
| Overall Density | lb/ft$^3$ | 1.64 | 1.64 | 1.535 |

The aspect ratio decreases as the % of OH prepolymer increases as Examples 1–3 show, from 1.35 to 1.07 to 1.01, respectively. These aspect ratios indicate that the presence of the OH prepolymer reduces the undesirable cell elongation in rigid foams.

Examples 4–9 in Table 2, were processed as Examples 1–3, except that a more complex mold shape was used. The rigid foams of Table 2 were formed in an elbow mold with the following dimensions: 2"×8½×12". The foams were molded at a 15° angle of the elbow bottom

TABLE 2

| | | Example: | | | | | |
|---|---|---|---|---|---|---|---|
| | | 4 | 5 | 6 | 7 | 8 | 9 |
| Polyether Polyol A | grams | 21 | | | 42 | 42 | 21 |
| Polyether Polyol C | grams | 21 | 42 | 42 | | | 21 |
| Polyester A | grams | 10 | | 20 | | 20 | 10 |
| Polyether Polyol D | grams | 10 | 20 | | 20 | | 10 |
| Polyether Polyol B | grams | 6.72 | 6.72 | 6.72 | 6.72 | 6.72 | 6.72 |
| OH Prepolymer | grams | 5 | 10 | 10 | 10 | 10 | 5 |
| Surfactant A | grams | 2.25 | 2.25 | 2.25 | 2.25 | 2.25 | 2.25 |
| Water | grams | 1.55 | 1.7 | 1.65 | 1.65 | 1.7 | 1.55 |
| Amine A | grams | 0.75 | 0.5 | 0.5 | 1 | 1 | 0.75 |
| Catalyst A | grams | 0.38 | 0.5 | 0.17 | 1 | 0.33 | 0.38 |
| Isocyanate C | grams | 74.8 | 167.2 | | | 165.5 | 74.8 |
| Isocyanate B | grams | 74.8 | | 158.5 | 16.2 | | 74.8 |
| Blowing Agent A | grams | 30.1 | 33.1 | 31.8 | 32.4 | 32.8 | 30.1 |
| Cell Size + | μm | 164 | 326 | 215 | 166 | 192 | 158 |
| Cell Size = | μm | 208 | 321 | 20.6 | 174 | 205 | 172 |
| Aspect Ratio | | 1.27 | 0.98 | 0.96 | 1.05 | 1.07 | 1.09 |
| Closed Cell Content | % | 89.4 | 87.9 | 84.8 | 90.3 | 90.5 | 89.6 |
| Compr Strgth 10% + | psi | 15.1 | 17.6 | 15.6 | 17 | 17.8 | 16.5 |
| Compr Strgth 10% = | psi | 25.2 | 23.7 | 21.5 | 31.5 | 29.4 | 17.3 |
| Compr Strgth 5% + | psi | 14.9 | 16.3 | 15.2 | 15.8 | 16.4 | 15 |

TABLE 2-continued

|  |  | Example: | | | | | |
|---|---|---|---|---|---|---|---|
|  |  | 4 | 5 | 6 | 7 | 8 | 9 |
| Compr Strgth 5% = | psi | 24.2 | 21.6 | 21.7 | 30.5 | 30 | 16.4 |
| Core Density | lb/ft$^3$ | 1.63 | 1.7 | 2.06 | 1.76 | 1.68 | 1.6 |
| k-Factor (35° F.) | BTU in/hr ft$^2$ F. | 0.122 | 0.128 | 0.138 | 0.12 | 0.126 | 0.122 |
| k-Factor (75° F.) | BTU in/hr ft$^2$ F. | 0.128 | 0.136 | 0.142 | 0.126 | 0.131 | 0.129 |
| Overall Density | lb/ft$^3$ | 1.84 | 1.99 | 2.46 | 1.99 | 1.89 | 1.8 |

The rigid foam of Example 5 contains 10 grams of the OH prepolymer and exhibits an aspect ratio of 0.98. Examples 4–9 test various polyether polyols and isocyanates.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a rigid foam comprising the step of reacting:
   (A) an organic polyisocyanate component selected from the group consisting of:
      (1) a polymethylene poly(phenylisocyanate) having an NCO group content of 30.5% to 33.0%, and a monomer content of 42 to 48%, wherein:
         (i) less than about 0.5% comprises the 2,2'-isomer,
         (ii) from about 2 to about 4% comprises the 2,4'-isomer,
         (iii) from about 40 to about 46% comprises the 4,4'-isomer, and
         (iv) from about 52 to about 58% by weight comprises higher ring homologues of the MDI series;
         with the %'s by weight of (A)(1)(i), (A)(1)(ii), (A)(1)(iii) and (A)(1)(iv) totaling 100% by weight of the component (A)(1); and
      (2) an NCO-terminated prepolymer having an NCO group content of about 26.0% to about 30.0%, and comprising the reaction product of:
         (a) a polyester comprising the reaction product of
            (i) pure ortho-phthalic acid or phthalic anhydride; and
            (ii) a glycol; and
         (b) a polymethylene poly(phenylisocyanate) having an NCO group content of about 30.5% to 33.0% and a monomer content of about 42 to about 48%, wherein:
            (i) less than about 0.5% by weight comprises the 2,2'-isomer,
            (ii) from about 2 to about 4% by weight of the 2,4'-isomer,
            (iii) from about 40 to 46% by weight of the 4,4'-isomer; and
            (iv) from about 52 to about 58% by weight of higher ring homologues of the diphenylmethane diisocyanate series,
            with the %'s by weight of (A)(2)(b)(i), (A)(2)(b)(ii), (A)(2)(b)(iii) and (A)(2)(b)(iv) totaling 100% by weight of (A)(2)(b) the polyisocyanate component; with
   (B) an isocyanate-reactive component comprising:
      (1) from 2 to 20% by weight, based on 100% by weight of (B), of a liquid OH-terminated prepolymer having a viscosity of at least about 100,000 mPa·s at 25° C., and which comprises the reaction product of:
         (a) an organic aromatic polyisocyanate component; and
         (b) an amine initiated polyether polyol component;
      (2) from 50 to 98% by weight, based on 100% by weight of component (B), of at least one polyether polyol having a molecular weight of from 280 to 1,120, a functionality of from 2 to 6, and an OH number of from 300 to 800; and
      (3) from 0 to 30% by weight, based on 100% by weight of (B), of at least one aromatic polyester polyol having an OH number of from 100 to 400, and a functionality of 1.8 to 2.5;
   in the presence of:
   (C) at least one catalyst; and
   (D) at least one blowing agent;
   wherein the relative amounts of components present is such that the Isocyanate Index is from 90 to 170.

2. The process of claim 1, wherein the Isocyanate Index is from 110 to 145.

3. The process of claim 1, wherein (A)(1) a polymethylene poly(phenylisocyanate) has an NCO group content of about 30.5%.

4. The process of claim 1, wherein (A)(2) an NCO-terminated prepolymer has an NCO group content of about 29%.

5. The process of claim 1, wherein (A)(2)(b) a polymethylene poly(phenylisocyanate) has an NCO group content of about 31.5%.

6. The process of claim 1, wherein (A)(2)(b)(ii) the 2,4' isomer of a dimethylene di(phenylisocyanate) is present in an amount of about 3.6% of the total monomer content.

7. The process of claim 1, wherein (B)(1) said OH-terminated prepolymer has a viscosity of more than about 100,000 mPa·s at 25° C. and comprises the reaction product of: (a) an aromatic polyisocyanate component comprising toluene diisocyanate and (b) a polyether polyol initiated from ortho-toluene diamine, and said polyether polyol having a molecular weight of about 340, a functionality of about 4 and an OH number of about 665.

8. The process of claim 7, wherein (B)(1)(a) said aromatic polyisocyanate component comprises about 80% by weight of the 2,4'-isomer of toluene diisocyanate and about 20% by weight of the 2,6'-isomer of toluene diisocyanate.

9. The process of claim 1, wherein (B)(1) said liquid OH-terminated prepolymer is present in an amount of 5 to 15% by weight, based on 100% by weight of (B).

10. The process of claim 1, wherein (B)(1) said liquid OH-terminated prepolymer has a viscosity of about 200,000 to 500,000 mPa·s at 25° C.

11. The process of claim 1, wherein (B)(1)(b) said amine initiated polyether polyol has a molecular weight of 190 to 5,000.

12. The process of claim 1, wherein (B)(1)(b) said amine initiated polyether polyol component has a functionality of from about 1.5 to 6.

13. The process of claim 1, wherein (B)(1)(b) said amine initiated polyether polyol component has an OH number of from about 20 to 700.

14. The process of claim 1, wherein (B)(2) said polyether polyol component is present in an amount of 65 to 85% by weight, based on 100% by weight of (B).

15. The process of claim 1, wherein (B)(3) said aromatic polyester polyol component is present in an amount of 10 to 30% by weight, based on 100% by weight of (B).

16. The process of claim 1, wherein (A)(2)(a)(ii) comprises diethylene glycol.

17. The process of claim 1, wherein the resultant rigid foam is isotropic.

18. A rigid foam comprising the reaction product of:
(A) an organic polyisocyanate component selected from the group consisting of:
  (1) a polymethylene poly(phenylisocyanate) having an NCO group content of 30.5% to 33.0%, and a monomer content of 42 to 48%, wherein the polyisocyanate comprises:
    (i) less than about 0.5% by weight of the 2,2' isomer of MDI,
    (ii) from about 2 to 4% by weight of the 2,4'-isomer of MDI,
    (iii) from about 40 to about 46% by weight of the 4,4'-isomer of MDI, and
    (iv) from about 52 to about 58% by weight of higher ring homologues of the diphenylmethane series, with the %'s by weight of (A)(1)(i), (A)(1)(ii), (A)(1)(iii) and (A)(1)(iv) totaling 100% by weight of the (A)(1) the polyisocyanate; and
  (2) an NCO-terminated prepolymer having an NCO group content of about 26.0% to about 30.0%, and comprising the reaction product of:
    (a) a polyester comprising the reaction product of:
      (i) pure ortho-phthalic acid or phthalic anhydride; and
      (ii) a glycol; and
    (b) a polymethylene poly(phenylisocyanate) having an NCO group content of about 30.5% to 33.0% and a monomer content of about 42 to about 48% by weight, wherein the polyisocyanate comprises:
      (i) less than about 0.5% by weight of the 2,2'-isomer of MDI,
      (ii) from about 2 to about 4% by weight of the 2,4'-isomer of MDI,
      (iii) from about 40 to about 46% by weight of the 4,4'-isomer of MDI, and
      (iv) from about 52 to about 58% by weight of higher ring homologues of the diphenylmethane diisocyanate series, with the %'s by weight of (A)(2)(b)(i), (A)(2)(b)(ii), (A)(2)(b)(iii) and (A)(2)(b)(iv) totaling 100% by weight of (A)(2)(b) the polyisocyanate; with
(B) an isocyanate-reactive component comprising:
  (1) from 2 to 20% by weight, based on 100% by weight of (B), of a liquid OH-terminated prepolymer having a viscosity of at least about 100,000 mPa·s at 25° C., and which comprises the reaction product of:
    (a) an organic aromatic polyisocyanate component; and
    (b) an amine initiated polyether polyol component;
  (2) from 50 to 98% by weight, based on 100% by weight of component (B), of at least one polyether polyol having a molecular weight of from 280 to 1,120, a functionality of from 2 to 6, and an OH number of from 300 to 800; and
  (3) from 0 to 30% by weight, based on 100% by weight of (B), of at least one aromatic polyester polyol having an OH number of from 100 to 400, and a functionality of 1.8 to 2.5;
in the presence of:
(C) at least one catalyst; and
(D) at least one blowing agent;
wherein the relative amounts of components present is such that the Isocyanate Index is from 90 to 170.

19. The rigid foam of claim 18, wherein the Isocyanate Index is from 110 to 145.

20. The rigid foam of claim 18, wherein (A)(1) a polymethylene poly(phenylisocyanate) has an NCO group content of about 30.5%.

21. The rigid foam of claim 18, wherein (A)(2) an NCO-terminated prepolymer has an NCO group content of about 29%.

22. The rigid foam of claim 18, wherein (A)(2)(b) a polymethylene poly(phenylisocyanate) has an NCO group content of about 31.5%.

23. The rigid foam of claim 18, wherein (A)(2)(b)(ii) the 2,4' isomer of a dimethylene di(phenylisocyanate) is present in an amount of about 3.6% of the total monomer content.

24. The rigid foam of claim 18, wherein (B)(1) said OH-terminated prepolymer has a viscosity of more than about 100,000 mPa·s at 25° C. and comprises the reaction product of: (a) an aromatic polyisocyanate component comprising toluene diisocyanate and (b) a polyether polyol initiated from ortho-toluene diamine, and said polyether polyol having a molecular weight of about 340, a functionality of about 4 and an OH number of about 665.

25. The rigid foam of claim 24, wherein (B)(1)(a) said aromatic polyisocyanate component comprises about 80% by weight of the 2,4'-isomer of toluene diisocyanate and about 20% by weight of the 2,6'-isomer of toluene diisocyanate.

26. The rigid foam of claim 18, wherein (B)(1) said liquid OH-terminated prepolymer is present in an amount of 5 to 15% by weight, based on 100% by weight of (B).

27. The rigid foam of claim 18, wherein (B)(1) said liquid OH-terminated prepolymer has a viscosity of about 200,000 to 500,000 mPa·s at 25° C.

28. The rigid foam of claim 18, wherein (B)(1)(b) said amine initiated polyether polyol has a molecular weight of 190 to 5,000.

29. The rigid foam of claim 18, wherein (B)(1)(b) said amine initiated polyether polyol component has a functionality of from about 1.5 to 6.

30. The rigid foam of claim 18, wherein (B)(1)(b) said amine initiated polyether polyol component has an OH number of from about 20 to 700.

31. The rigid foam of claim 18, wherein (B)(2) said polyether polyol component is present in an amount of 65 to 85% by weight, based on 100% by weight of (B).

32. The rigid foam of claim 18, wherein (B)(3) said aromatic polyester polyol component is present in an amount of 10 to 30% by weight, based on 100% by weight of (B).

33. The rigid foam of claim 18, wherein (A)(2)(a)(ii) comprises diethylene glycol.

34. The rigid foam of claim 18 wherein said foam is isotropic.

* * * * *